United States Patent
Papousek

(10) Patent No.: US 7,387,319 B2
(45) Date of Patent: Jun. 17, 2008

(54) COUPLING FOR ANCHOR BOLTS

(75) Inventor: Herbert Papousek, Feistritz/Drau (AT)

(73) Assignee: Atlas Copco MAI GmbH, Feistritz an der Drau (AT)

( * ) Notice: Subject to any disclaimer, the term of this patent is extended or adjusted under 35 U.S.C. 154(b) by 0 days.

(21) Appl. No.: 10/519,459

(22) PCT Filed: Jul. 28, 2003

(86) PCT No.: PCT/AT03/00214

§ 371 (c)(1),
(2), (4) Date: Jan. 4, 2006

(87) PCT Pub. No.: WO2004/013531

PCT Pub. Date: Feb. 12, 2004

(65) Prior Publication Data

US 2006/0108805 A1   May 25, 2006

(30) Foreign Application Priority Data

Aug. 1, 2002   (AT) .............................. A 1177/2002

(51) Int. Cl.
*F16L 15/00* (2006.01)
*F16L 15/04* (2006.01)
(52) U.S. Cl. ...................................... 285/333; 285/355
(58) Field of Classification Search ................ 285/333, 285/334, 355, 390
See application file for complete search history.

(56) References Cited

U.S. PATENT DOCUMENTS

| | | | | |
|---|---|---|---|---|
| 320,738 | A * | 6/1885 | Wolfe | 285/349 |
| 3,567,254 | A * | 3/1971 | Parssinen | 403/307 |
| 3,645,570 | A * | 2/1972 | Johansson et al. | 403/307 |
| 3,822,952 | A * | 7/1974 | Johansson et al. | 403/343 |
| 4,373,750 | A | 2/1983 | Trouillet et al. | |
| 4,762,344 | A | 8/1988 | Perkins et al. | |
| 5,769,466 | A * | 6/1998 | Noel et al. | 285/332 |
| 5,888,025 | A * | 3/1999 | Papousek | 405/259.5 |
| 5,906,399 | A * | 5/1999 | Noel | 285/55 |
| 6,176,524 | B1 * | 1/2001 | Tsuru et al. | 285/55 |
| 6,196,598 | B1 * | 3/2001 | Yao | 285/333 |

FOREIGN PATENT DOCUMENTS

| | | |
|---|---|---|
| DE | 42 20 636 | 1/1994 |
| GB | 2 146 085 | 4/1985 |
| WO | WO 97 35137 | 9/1997 |

* cited by examiner

*Primary Examiner*—James M Hewitt
(74) *Attorney, Agent, or Firm*—Young & Thompson

(57) ABSTRACT

A coupling for anchor bolts, includes a sleeve having an internal screw thread and two anchor pipes having an external screw thread, the ends of the pipes being screwed into the sleeve. The sleeve is provided with an annular rib in the longitudinal centre thereof, the rib having a cylindrical inner end surface. The ends of the anchor pipes sealingly engage in the annular rib, and have cylindrical thread-free circumferential surfaces. In order to improve the tightness of the coupling and ensure that the transfer of impact energy from the first anchor pipe to the second anchor pipe does not engender much loss, the annular front surfaces of the anchor pipes are sealingly arranged against each other in the annular rib region. A leak-free coupling for anchor bolts which prevents the discharge of rinsing medium and/or setting mass is provided.

20 Claims, 4 Drawing Sheets

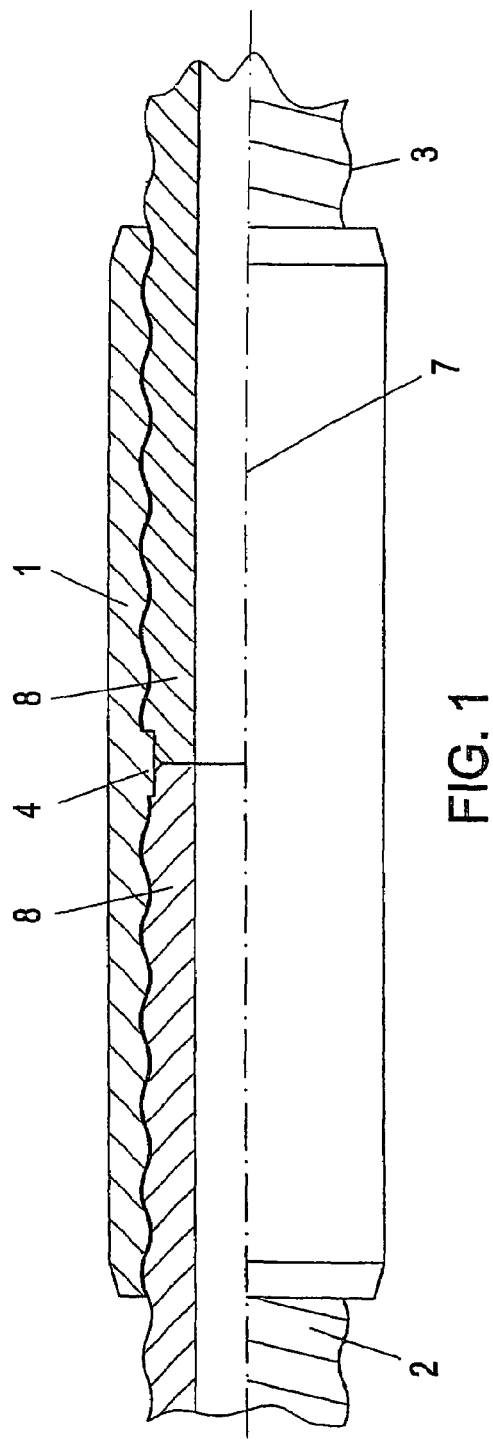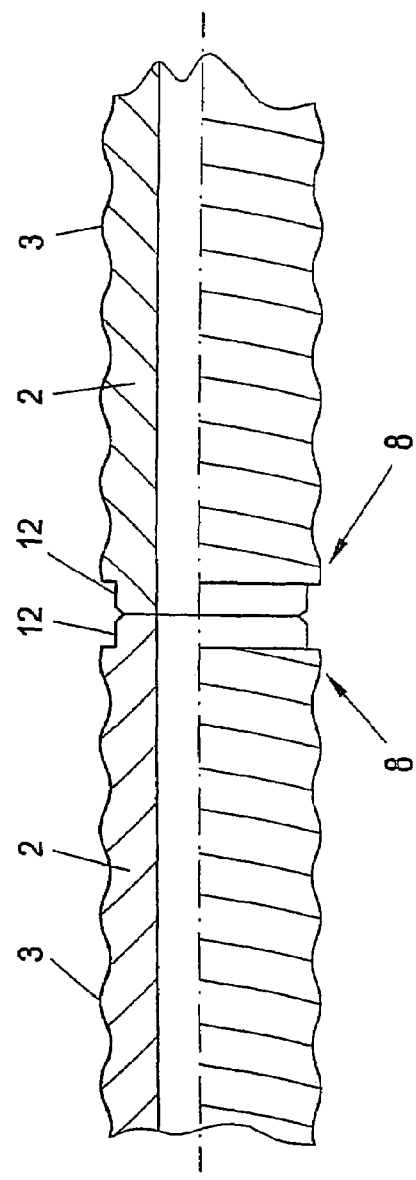

COUPLING FOR ANCHOR BOLTS

FIELD OF THE INVENTION

The invention relates to a coupling of drill anchors with a sleeve with an inside thread and with two anchor pipes which bear an outside thread and which are screwed into the sleeve from opposing sides.

These couplings are known.

BACKGROUND OF THE INVENTION

The problem in these couplings is that the flushing medium (air or water) which flows through the cavity of the anchor pipes while drilling and the setting mass (for example cement mortar) which is pressed through the cavity of the anchor pipes toward their front end which is held in the borehole after completion of the borehole can escape in the area of known couplings. In this way losses of flushing media occur and in the case of setting mass with leaky couplings plugs of setting mass form which prevent complete filling of the borehole around the drill anchor.

A coupling of the initially mentioned type is known from DE-A-42 20 636. DE-A-4 220 636 shows a coupling of drill anchors with a sleeve with an inside thread and with two anchor pipes which bear an outside thread and which are screwed into the sleeve from opposing sides, essentially in the lengthwise middle of the sleeve there being an annular rib which projects to the inside, and the front surfaces of the ends of the anchor pipes held in the sleeves being located in the area of the annular rib and directly adjoining one another, the outside surfaces of the ends of the anchor pipes adjoining the inner end surface of the annular rib, forming a seal. In the coupling as claimed in DE-A-42 20 636 there are annular seals located next to the annular rib.

OBJECT OF THE INVENTION

The object of the invention is to make available a coupling of the initially mentioned type which even under the loads which occur during drilling (rotary-impact movement of the drill anchor) is and remains reliably tight.

A coupling of the initially mentioned type is known from DE-A-42 20 636. DE-A-4 220 636 shows a coupling of drill anchors with a sleeve with an inside thread and with two anchor pipes which bear an outside thread and which are screwed into the sleeve from opposing sides, essentially in the lengthwise middle of the sleeve there being an annular rib which projects to the inside, and the front surfaces of the ends of the anchor pipes held in the sleeves being located in the area of the annular rib and directly adjoining one another, the outside surfaces of the ends of the anchor pipes adjoining the inner end surface of the annular rib, forming a seal. In the coupling as claimed in DE-A-42 20 636 there are annular seals located next to the annular rib.

SUMMARY OF THE INVENTION

Since in the coupling as claimed in the invention the ends of the anchor pipes which have been screwed into the sleeve fit into the annular rib which is provided in the sleeve, forming a seal, and due to the annular seal which is provided as claimed in the invention on the annular rib, the escape of flushing medium and/or setting mass in the area of the coupling is prevented.

If according to one preferred embodiment of the coupling as claimed in the invention it is provided that the ends of the anchor pipes, which ends are held in the sleeve, and which anchor pipes directly adjoin one another with their front surfaces, directly adjoin one another with their front surfaces to form a seal, additional sealing in the area of the coupling is ensured, since between the ends of the anchor pipes located in the coupling the flushing medium and/or the setting mass cannot escape. In addition, this measure of the invention has the advantage that the rotary-impact force which warps the drill anchor when drilling a hole in rock is less of a problem, since transmission takes place directly from anchor pipe to anchor pipe.

BRIEF DESCRIPTION OF THE DRAWINGS

Other details, features and advantages of the coupling as claimed in the invention result from the following description of the embodiment which is shown by way of example in the drawings.

FIG. 1 shows a coupling partially in a section,

FIG. 2 shows the adjoining ends of anchor pipes (without the sleeve) enlarged and partially cutaway.

DETAILED DESCRIPTION OF THE INVENTION

Figure 3:
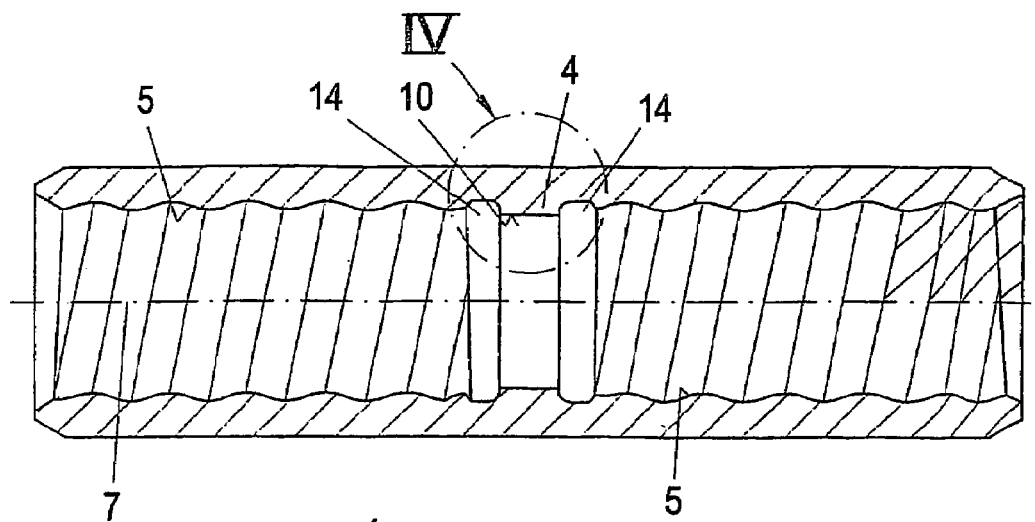
FIG. 3 shows a sleeve in a lengthwise section.
Figure 4:
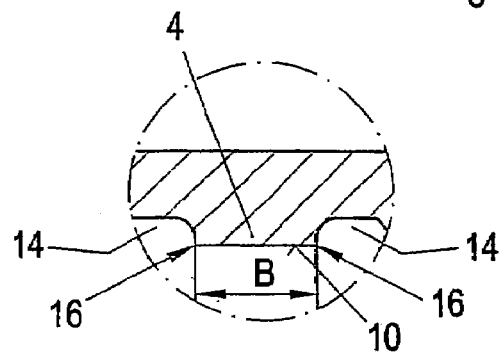
FIG. 4 shows detail IV from FIG. 3.
Figure 5:
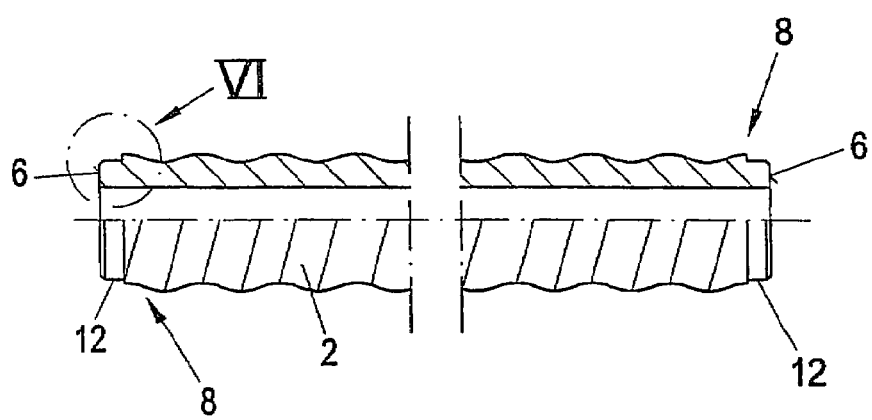
FIG. 5 shows an anchor pipe, partially in a section.

As shown in FIG. 1, a coupling consists of a sleeve 1 and two anchor pipes 2 which are held with their ends 8 in the sleeve 1.

The sleeve 2 has two internally threaded segments 5 which are separated from one another by an annular rib 4 which projects to the inside; the threads of the segments run in the same direction. On their outer surface the anchor pipes 2 bear an outside thread 3 which matches the inside thread 5 of the sleeve 1.

Figure 6:
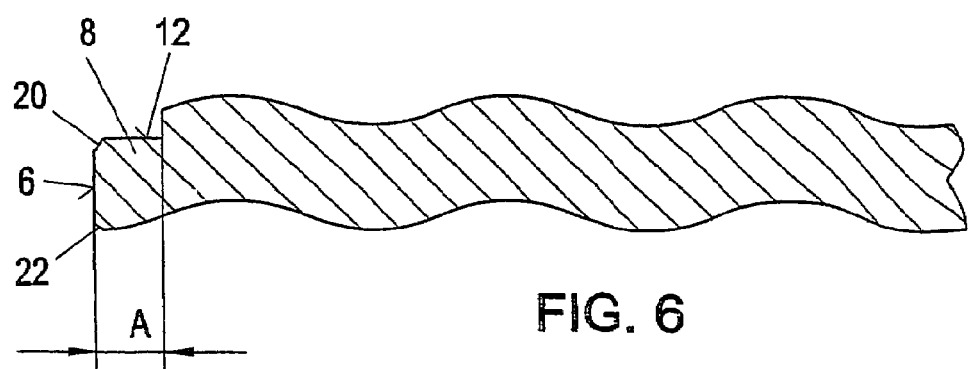
FIG. 6 shows detail VI from FIG. 5.

The anchor pipes 2, preferably on the two ends 8, have a segment without an inside thread which extends away from the front surfaces 6 of the anchor pipe 2. This segment without a thread is made with a cylindrical outside surface 12. The front surfaces 6 of the anchor pipes 2 which are made annular have a chamfer 20 outside and optionally a chamfer 22 inside (FIG. 6)

The annular rib 4 which is located in the lengthwise middle of the sleeve 1 has a cylindrical inner end surface 10 and two side surfaces 16 which are essentially normal to the axis 7 of the sleeve 1 and which on either side of the annular rib 4 with a radius (curvature) pass into the segment 14 of the inside surface of the sleeve 2, that is, the segment without an inside thread.

Figure 7:
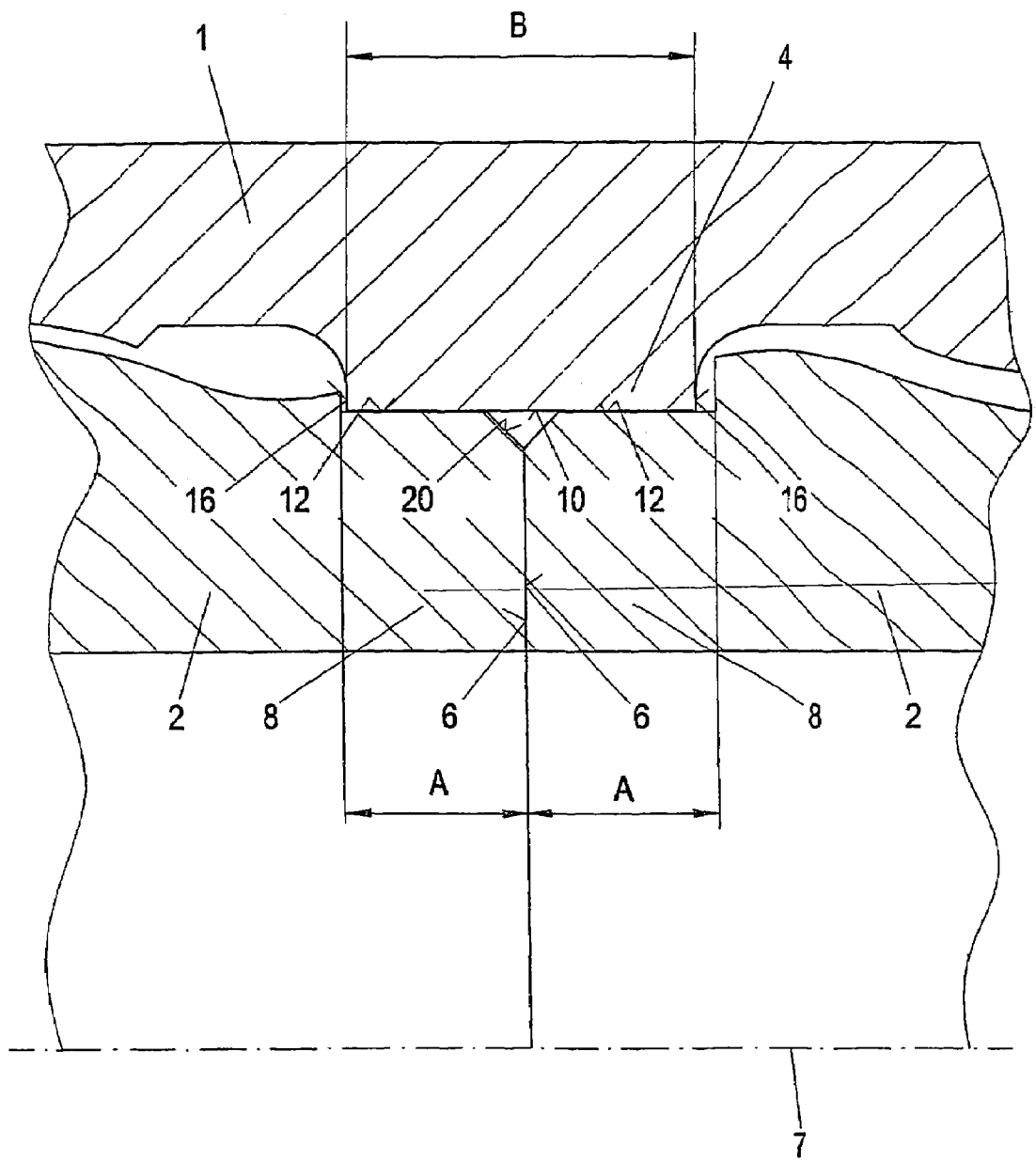
FIG. 7 shows enlarged a detail of the coupling in the area of the annular rib of the sleeve and FIG. 8 shows another embodiment of a coupling as claimed in the invention with the sleeve.

The situation for an assembled coupling is shown in FIG. 7. It is apparent that the anchor pipes 2 with their thread-free ends 8 are located within an annular rib 4, the cylinder surfaces 12 on the ends 8 of the anchor pipes 2 adjoining the inner end surface 10 of the annular rib 4, forming a seal (the gap shown in FIG. 7 between the surfaces 10 and 12 in practice is not present and is shown only for the sake of clarity).

FIG. 7 also shows that the annular front surface 6 of the ends 8 of the anchor pipes 2 directly adjoin one another to form a seal.

The width B of the annular rib 4, therefore the length of the cylindrical inner end surface 10 of the annular rib 4, which length is measured in the direction of the axis 7 of the sleeve 1, is roughly as great as the sum of the length A of the thread-free segments 12 on the ends 8 of the anchor pipes 2, which length is measured in the direction of the axis, i.e. in the lengthwise direction of the anchor pipes 2. This results in that a sleeve 1 cannot be screwed too far onto the anchor pipe 2 since the shoulder on the end of the cylinder surface 12 of the anchor pipe 2 strikes the side surface 16 of the annular rib 4 when the front surface 6 of this anchor pipe 2 is located roughly in the middle of the lengthwise extension of the rib 4. Thus it is ensured that there is an essentially symmetrical structure of the coupling as claimed in the invention consisting of the sleeve 1 and two anchor pipes 2 which are held (screwed) in it.

Figure 8:
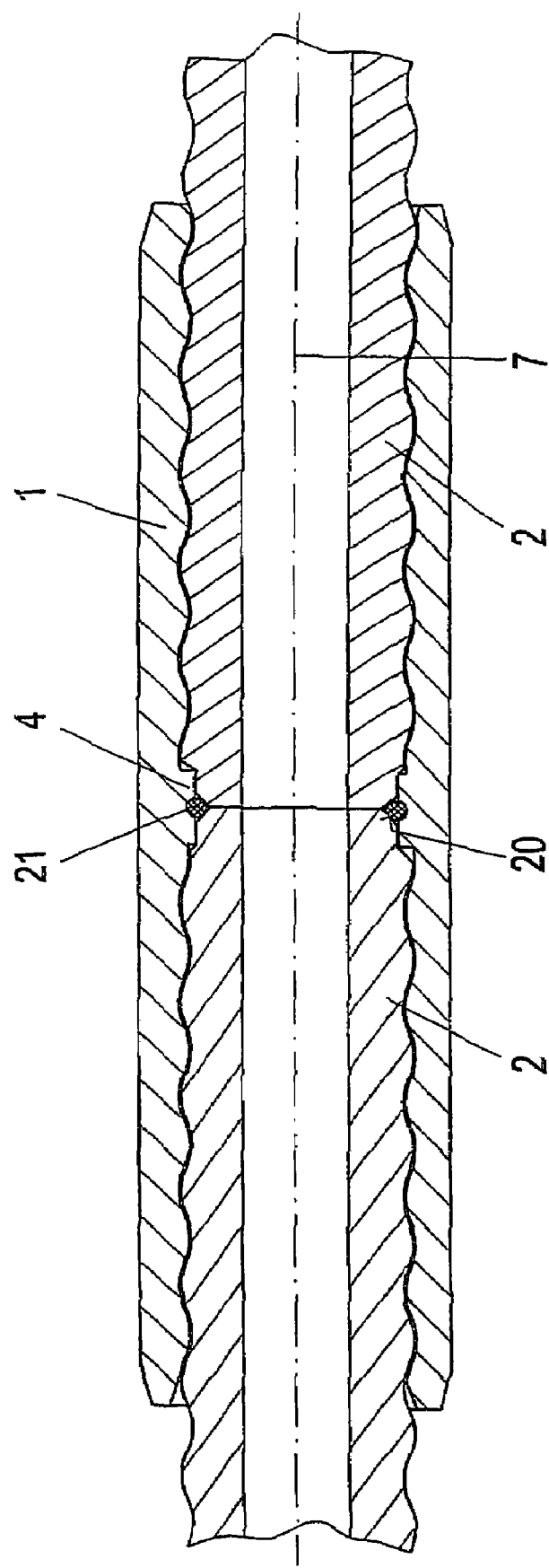

In the coupling as claimed in the invention which is shown in FIG. 8, in the cylinder surface of the annular rib 4 which points to the inside there is an annular groove in which an annular seal 21 of elastic material (O-ring) is inserted.

The anchor pipes 2 which are screwed into the sleeve 1 with their chamfers 20 on the outside edge of the front surfaces 6 which also adjoin one another in this embodiment adjoin this seal 21 so that the seal between the two anchor pipes 2 is further improved in the area of the coupling.

It should be pointed out that in FIG. 8 the annular seal 21 is shown "idealized", therefore with its original round cross sectional shape. In fact, in the assembled state of the coupling it will be deformed in its part which projects over the inside surface of the annular rib 4 into a triangular cross sectional shape according to the outside chamfers 20 on the end surfaces 6 of the anchor pipes 2.

The cross sectional shape of the annular seal 21 need not be round. For example, the annular seal can have a polygonal cross sectional shape (rectangular or quadratic). It is also conceivable for the part of the annular seal 21 which projects over the inside surface of the annular rib 4 to have a wedge-shaped cross sectional shape which tapers radially to the inside.

In summary, one preferred embodiment of the invention can be described as follows:

A coupling of drill anchors has a sleeve 1 with an inside thread 5 and two anchor pipes 2 which are provided with an outside thread 3 and which have ends 8 which are screwed into the sleeve 1. The sleeve 1 in its lengthwise middle bears an annular rib 4 with a cylindrical inner end surface 10. The ends 8 of the anchor pipes 2 fit into this annular rib 4 to form a seal, for which they are made with cylindrical, thread-free peripheral surfaces 12. In order to improve the tightness of the coupling and to make the transmission of impact energy from the anchor pipe 2 to the anchor pipe 2 experience less loss, the annular front surfaces 6 of the anchor pipes 2 adjoin one another in the area of the annular rib 4 to form a seal. Thus, a coupling for drill anchors is made available which is free of leaks and which prevents the escape of the flushing medium and/or setting mass.

The invention claimed is:

1. A coupling of drill anchors, comprising:
a sleeve (1) with an inside thread (5) and with two anchor pipes (2) which bear an outside thread (3) and which are screwed into the sleeve (1) from opposing sides;
an annular rib (4) essentially in the lengthwise middle of the sleeve (1) and which projects to an inside;
front surfaces (6) of ends (8) of the anchor pipes (2), which ends are held in the sleeve (1), being located in the area of the annular rib (4) and directly adjoining one another; and
wherein the annular rib (4) has a cylindrical inner end surface (10), that the outside surfaces (12) of the cylindrically shaped, thread-free ends (8) of the anchor pipes (2) adjoin the inner end surface (10) of the annular rib (4), forming a seal, that the front surfaces (6) of the anchor pipes (2) each have a chamfer (22) inside and/or (20) outside, that there is at least one annular seal (21) on the annular rib (4), and that the anchor pipes (2) with the chamfers (20) on the outside edge of their front surfaces (6) adjoin the annular seal (21) which is disposed in the space bounded by said chamfers (20) and said rib (4), and side surfaces (16) of the annular rib (4) are aligned normally to an axis (7) of the sleeve (1), the front surfaces (6) of the anchor pipes (2) adjoining one another to form a seal.

2. The coupling as claimed in claim 1, wherein in the sleeve (1) on either side of the annular rib (4) there are areas (14) which have no inside thread.

3. The coupling as claimed in claim 1, wherein the width (B) of the annular rib (4) measured in the direction of the axis (7) of the sleeve (1) is essentially the same size as the sum of the lengths (A) of the cylindrically shaped, thread-free ends (8) of the anchor pipes (2), that is, lengths measured in the lengthwise direction of the anchor pipes (2).

4. The coupling as claimed in claim 1, wherein the annular seal (21) is inserted into an annular groove which is open to the inside in the cylindrical inner end surface (10) of the annular rib (4).

5. The coupling as claimed in claim 4, wherein the part of the annular seal (21) which projects over the inner end surface (10) of the annular rib (4) is deformed by the chamfers (20) of the front surfaces (6) of the anchor pipes (2).

6. The coupling as claimed in claim 1, wherein the annular seal (21) is disposed in the space bounded by said chamfers (20) and said cylindrical inner end surface (10).

7. A coupling of drill anchors, comprising:
a sleeve (1) with an inside thread (5) and with two anchor pipes (2) which bear an outside thread (3) and which are screwed into the sleeve (1) from opposing sides;
an annular rib (4) essentially in the lengthwise middle of the sleeve (1) and which projects to an inside;
front surfaces (6) of ends (8) of the anchor pipes (2), which ends are held in the sleeve (1), being located in the area of the annular rib (4) and directly adjoining one another; and
wherein the annular rib (4) has a cylindrical inner end surface (10), that the outside surfaces (12) of the cylindrically shaped, thread-free ends (8) of the anchor pipes (2) adjoin the inner end surface (10) of the annular rib (4), forming a seal, that the front surfaces (6) of the anchor pipes (2) each have a chamfer (22) inside and/or (20) outside, that there is at least one annular seal (21) on the annular rib (4), and that the anchor pipes (2) with the chamfers (20) on the outside edge of their front surfaces (6) adjoin the annular seal (21) which is disposed in the space bounded by said chamfers (20) and said rib (4), and side surfaces (16) of the annular rib (4) are aligned normally to an axis (7) of the sleeve (1), the side surfaces (16) of the annular rib (1) with radii passing into the inside surface of the sleeve (1), into segments (14) which are free of threads.

8. The coupling as claimed in claim 7, wherein the front surfaces (6) of the anchor pipes (2) adjoin one another to form a seal.

9. The coupling as claimed in claim 7, wherein in the sleeve (1) on either side of the annular rib (4) there are areas (14) which have no inside thread.

10. The coupling as claimed in claim 7, wherein the width (B) of the annular rib (4) measured in the direction of the axis (7) of the sleeve (1) is essentially the same size as the sum of the lengths (A) of the cylindrically shaped, thread-free ends (8) of the anchor pipes (2), that is, lengths measured in the lengthwise direction of the anchor pipes (2).

11. The coupling as claimed in claim 7, wherein the annular seal (21) is inserted into an annular groove which is open to the inside in the cylindrical inner end surface (10) of the annular rib (4).

12. The coupling as claimed in claim 11, wherein the part of the annular seal (21) which projects over the inner end surface (10) of the annular rib (4) is deformed by the chamfers (20) of the front surfaces (6) of the anchor pipes (2).

13. The coupling as claimed in claim 7, wherein the annular seal (21) is disposed in the space bounded by said chamfers (20) and said cylindrical inner end surface (10).

14. A coupling of drill anchors, compring:
- a sleeve (1) with an inside thread (5) and with two anchor pipes (2) which bear an outside thread (3) and which are screwed into the sleeve (1) from opposing sides;
- an annular rib (4) essentially in the lengthwise middle of the sleeve (1) and which projects to an inside;
- front surfaces (6) of ends (8) of the anchor pipes (2), which ends are held in the sleeve (1), being located in the area of the annular rib (4) and directly adjoining one another; and
- wherein the annular rib (4) has a cylindrical inner end surface (10), that the outside surfaces (12) of the cylindrically shaped, thread-free ends (8) of the anchor pipes (2) adjoin the inner end surface (10) of the annular rib (4), forming a seal, that the front surfaces (6) of the anchor pipes (2) each have a chamfer (22) inside and/or (20) outside, that there is at least one annular seal (21) on the annular rib (4), and that the anchor pipes (2) with the chamfers (20) on the outside edge of their front surfaces (6) adjoin the annular seal (21) which is disposed in the space bounded by said chamfers (20) and said rib (4), and side surfaces (16) of the annular rib (4) are aligned normally to an axis (7) of the sleeve (1), the front surfaces (6) of the anchor pipes (1) having a chamfer (22) inside.

15. The coupling as claimed in claim 14, wherein the front surfaces (6) of the anchor pipes (2) adjoin one another to form a seal.

16. The coupling as claimed in claim 14, wherein in the sleeve (1) on either side of the annular rib (4) there are areas (14) which have no inside thread.

17. The coupling as claimed in claim 14, wherein the width (B) of the annular rib (4) measured in the direction of the axis (7) of the sleeve (1) is essentially the same size as the sum of the lengths (A) of the cylindrically shaped, thread-free ends (8) of the anchor pipes (2), that is, lengths measured in the lengthwise direction of the anchor pipes (2).

18. The coupling as claimed in claim 14, wherein the annular seal (21) is inserted into an annular groove which is open to the inside in the cylindrical inner end surface (10) of the annular rib (4).

19. The coupling as claimed in claim 18, wherein the part of the annular seal (21) which projects over the inner end surface (10) of the annular rib (4) is deformed by the chamfers (20) of the front surfaces (6) of the anchor pipes (2).

20. The coupling as claimed in claim 14, wherein the annular seal (21) is disposed in the space bounded by said chamfers (20) and said cylindrical inner end surface (10).

* * * * *